(12) United States Patent
Schumacher

(10) Patent No.: US 7,841,094 B2
(45) Date of Patent: Nov. 30, 2010

(54) OPTICAL INSTRUMENT WITH ANGLE INDICATOR AND METHOD FOR OPERATING THE SAME

(75) Inventor: Lars Schumacher, Relsberg (DE)

(73) Assignee: Trimble Kaiserslautern GmbH, Kaiserslautern (DE)

(*) Notice: Subject to any disclaimer, the term of this patent is extended or adjusted under 35 U.S.C. 154(b) by 123 days.

(21) Appl. No.: 12/360,314

(22) Filed: Jan. 27, 2009

(65) Prior Publication Data

US 2010/0186243 A1   Jul. 29, 2010

(51) Int. Cl.
*G01C 1/00* (2006.01)

(52) U.S. Cl. .............................. 33/282; 33/290; 340/689

(58) Field of Classification Search .................... 33/281, 33/282, 283, 290, 291; 340/689
See application file for complete search history.

(56) References Cited

U.S. PATENT DOCUMENTS

| 2,959,088 | A |   | 11/1960 | Rantsch |
|---|---|---|---|---|
| 3,253,525 | A |   | 5/1966 | Merkel |
| 3,936,197 | A |   | 2/1976 | Aldrink et al. |
| 4,053,238 | A |   | 10/1977 | George et al. |
| 4,497,118 | A |   | 2/1985 | Byrum |
| 5,347,136 | A |   | 9/1994 | Ammann |
| 5,552,886 | A | * | 9/1996 | Kitajima et al. ............... 33/291 |
| 5,621,531 | A |   | 4/1997 | Van Andel et al. |
| 5,655,307 | A |   | 8/1997 | Ogawa et al. |
| 5,698,827 | A |   | 12/1997 | Turjancik |
| 5,757,504 | A |   | 5/1998 | Yamaguchi |
| 6,049,377 | A |   | 4/2000 | Lau et al. |
| 6,119,355 | A | * | 9/2000 | Raby ............................ 33/291 |
| 6,332,276 | B1 |   | 12/2001 | Mangel |
| 6,392,556 | B2 | * | 5/2002 | Tomich ....................... 340/689 |
| 6,922,063 | B2 |   | 7/2005 | Heger |
| 7,096,591 | B2 |   | 8/2006 | Glantz et al. |
| 7,181,853 | B2 |   | 2/2007 | Heger et al. |
| 7,181,856 | B1 |   | 2/2007 | Hanchett et al. |
| 2005/0005462 | A1 |   | 1/2005 | Heger et al. |
| 2005/0007125 | A1 |   | 1/2005 | Heger |
| 2006/0242850 | A1 | * | 11/2006 | Ammann et al. .............. 33/290 |
| 2007/0229802 | A1 |   | 10/2007 | Lau |
| 2008/0072439 | A1 | * | 3/2008 | Steffen et al. ................. 33/291 |
| 2009/0119050 | A1 | * | 5/2009 | Hayashi ....................... 702/94 |
| 2009/0133273 | A1 | * | 5/2009 | Westermark et al. .......... 33/281 |
| 2010/0088910 | A1 | * | 4/2010 | Svanholm et al. ............. 33/290 |

FOREIGN PATENT DOCUMENTS

| DE | 4416586 A1 | 11/1995 |
|---|---|---|
| DE | 1983465 C1 | 4/2000 |
| EP | 0 622 609 A2 | 11/1994 |

\* cited by examiner

*Primary Examiner*—G. Bradley Bennett
(74) *Attorney, Agent, or Firm*—Dinsmore & Shohl LLP

(57) ABSTRACT

The present invention relates to an optical instrument with an angle indicator and a method for operating the same enabling simple monitoring of instrument inclination and operation in a large angle range. The optical instrument comprises a base portion, a head portion tiltable relative to the base portion within a device angle range, a base angle indicator attached to the base portion for determining a base angle of the base portion and a determination unit for determining an indication angle range of the head portion based on the base angle and the device angle range.

14 Claims, 5 Drawing Sheets

OPTICAL INSTRUMENT WITH ANGLE INDICATOR AND METHOD FOR OPERATING THE SAME

FIELD OF THE INVENTION

The present invention relates to an optical instrument with an angle indicator and a method for operating the same, and in particular to an optical instrument having a head portion and a base portion with an angle indicator attached thereto.

BACKGROUND

Various kinds of optical instruments are commonly employed in various surveying and construction applications and are used for measuring distances and/or angles of objects or for indicating a direction or plane by a laser. Generally an optical instrument is first set up in an absolutely level position in an initial leveling procedure. After the instrument is in the level position, the actual surveying or indicating procedure can start, including calculating any angles of an emitted laser beam of the optical instrument under the condition that the instrument is in the level position.

For example, in construction applications, a laser beam emitted by the instrument can be used as an elevational reference over a work area such as for example a construction site. If a laser beam emitter is arranged to rotate the laser beam in a plane, the rotating laser beam can be used to establish a reference work plane as an elevational reference over a two-dimensional work area. Laser beam detectors placed remote from the instrument intercept the laser beam for guidance. For example the laser beam detectors are carried by earth moving equipment to determine proper elevation at various points throughout the work area. If the laser beam or the reference work plane is tilted by a known angle or angles for example to a horizontal direction, various kinds of slopes can be indicated by way of the laser.

However, especially under field conditions, e.g. outdoors at a construction site, the positioning of an optical instrument and thus also its operation may not be simple. Uneven and muddy ground may lead to a tilting of the instrument which is usually corrected manually. Moreover, an initial leveling procedure may be time consuming.

More precisely, optical instruments with angle indicators are known, which provide an operator with information about the inclination of the optical instrument. For years, bubble vials have been used as level indicators so that the operator may adjust a stand of an optical instrument, e.g. a tripod, to bring the instrument into an leveled operation state. This often requires changing the position and the length of the legs of the tripod until the bubble indicator indicated that the instrument is leveled.

Bubble vials may be used in combination with a light emitting element and a photo sensor so that an electronic signal indicating the leveling state may be provided. Further, a bubble level or vial usually only allows for indicating a very small angle of about ±1 or 2 degrees from a horizontal plane perpendicular with respect to gravity.

A bubble level is thus capable of indicating the level of a surface between horizontal and vertical to usually the nearest degree, e.g. the level of a surface of a base portion of an optical instrument with respect to gravity. Such level indicators are therefore suitable if an initial leveling procedure is carried out. However, bubble indicators are not suitable for assessing larger inclinations of the optical instrument, e.g. if the instrument is not in an absolutely level position or if over time the instrument tilts and leaves an absolutely leveled position such as on soft ground.

SUMMARY OF THE INVENTION

Therefore, the need arises for an optical instrument and a method for operating the optical instrument enabling simple monitoring of instrument inclination in a large operating range.

According to an embodiment, an optical instrument comprises a base portion, a head portion tiltable relative to the base portion within a device angle range having a maximum device angle and a minimum device angle and a base angle indicator attached to the base portion for determining a base angle of the base portion. Further, the optical instrument comprises a determination unit for determining an indication angle range of the head portion based on the base angle and the device angle range. Accordingly, an optical instrument may be operated even if it is not fully leveled and an indication angle range may be determined in which the instrument can be operated.

According to an advantageous example, the determination unit is adapted to determine the indication angle range by adding the base angle to the device angle range. Accordingly, an indication angle range of the optical instrument for indicating a direction or taking data measurements may be obtained in easy manner.

According to another advantageous example, the determination unit is adapted to determine whether a desired indication angle is within the indication angle range. Accordingly, it can be determined whether a certain position, i.e. angular setting, may be achieved with the head portion of the optical instrument.

According to another advantageous example, the determination unit is adapted to determine whether the base angle of zero is within the indication angle range and/or a sub range of the indication angle range. Accordingly, different indication angle ranges may be defined, in which the optical instrument may operate.

According to another advantageous example, the optical instrument further comprises an alert unit for outputting an alert signal on the basis of the determination result. Accordingly, an operator or user may be informed of an inclination of the optical instrument that may severely disturb or prevent a measurement.

According to another advantageous example, the determination unit is adapted to repeatedly determine the indication angle range during operation. Accordingly, it can be determined, e.g. in predetermined time intervals, whether operation of the optical instrument is still possible, i.e. whether the head portion of the optical instrument may be able to move in a certain position of a specific angle for indication to take a measurement.

According to another advantageous example, the optical instrument further comprises a head angle indicator attached to the head portion for determining a head angle of the head portion. Accordingly, a relative angle based on the output of the head angle indicator and the base angle indicator may be obtained and it can be determined whether the head portion of the optical instrument may be moved in a certain position corresponding to a larger or smaller relative angle.

According to another advantageous example, the determination unit is adapted to obtain the difference between the base angle and the head angle and to output an enable signal if the absolute value of the difference is smaller than a self leveling threshold. Accordingly, the tilt of the head portion relative to the base portion based on the angle of the head portion and the angle of the base portion may be measured and a signal may be output indicating whether operation in a certain range of the optical instrument is possible.

According to another advantageous example, at least one of the base indicator and the head angle indicator is a microelectromechanical sensor (MEMS). Accordingly, a simple and cheap angle indicator may be provided that can be easily interfaced with existing positioning electronics of an optical instrument.

According to another advantageous example, the optical instrument further comprises a reference level angle indicator for calibrating at least one of the base angle indicator and the head angle indicator. Accordingly, at least one of the angle indicators may be calibrated with respect to an absolute value, such as the direction of gravity or similar.

According to another embodiment, a method for operating an optical instrument having a base portion and a head portion tiltable relative to the base portion within a device angle range, comprises determining a base angle of the base portion, and determining an indication angle range of the head portion based on the base angle and the device angle range. Accordingly, operation is enabled even if an optical instrument is not fully leveled and an indication angle range for operation may be determined.

According to another embodiment, a program may be provided including instructions adapted to cause data processing means to carry out a method with the above features.

According to another embodiment, a computer readable medium may be provided, in which a program is embodied, where the program is to make a computer execute the method with the above features.

According to another embodiment, a computer program product may be provided, comprising the computer readable medium.

Further advantageous features of the invention are disclosed in the claims.

DETAILED DESCRIPTION OF THE PREFERRED EMBODIMENTS

Preferred embodiments are described with reference to the figures. It is noted that the following description contains examples only and should not be construed as limiting the invention.

Embodiments generally relate to an optical instrument having a base portion and a head portion tiltable relative to the base portion and an angle indicator at the base portion so that the leveling state of the optical instrument may be determined or monitored. The leveling state can then be taken into account when measurements with the head portion are performed. For example, in embodiments deviations of a position or orientation of the base portion from a reference position or orientation are determined and taken into account when determining an available angle range of the head portion when in operation under this condition with respect to the reference position or orientation.

More precisely, in these embodiments, on the basis of a known device angle range of the instrument, i.e. an angle range defined by the maximum and minimum angles that the head portion may be tilted with respect to the base portion, and a base angle, i.e. an angle between the base portion and a reference orientation or plane of 0° or any other angle, e.g. the reference plane being perpendicular to gravity, it can thus be determined an indication angle range that is available for indicating a certain direction or plane in construction laser operations or for surveying in surveying operations. Here, the indication angle range is defined by a maximum and a minimum angle of the head portion with respect to the reference orientation or plane of 0° or any other angle. Moreover, on this basis it can be determined whether a leveling of the head portion is possible at all, i.e. whether an angle between the head portion and a reference orientation or plane perpendicular to gravity can be made to be 0° or any other angle.

Figure 1:
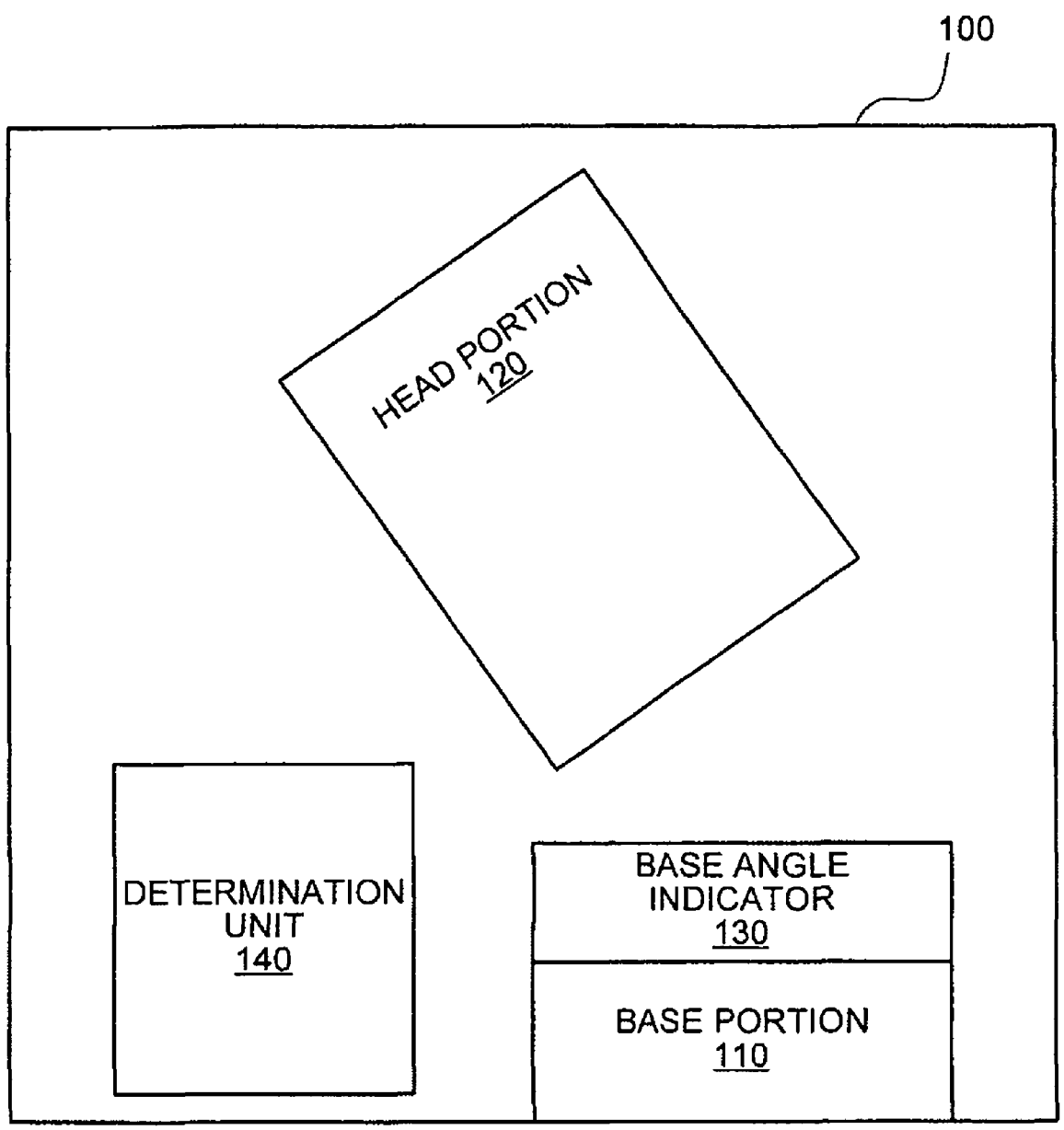
FIG. 1 illustrates elements of an optical instrument having a head portion and a base portion according to an embodiment of the invention.

FIG. 1 illustrates elements of an optical instrument 100 according to an embodiment of the invention, comprising a base portion 110, a head portion 120, a base angle indicator 130 and a determination unit 140.

Optical instruments, such as a construction laser, theodolithe, video tacheometer, or total station or any other kind of optical instrument for indicating or marking a direction or plane, e.g. a height of a wall under construction, or for determining a position of an object, respectively, are known that comprise a base portion 110 and a head portion 120 which is pivotable with respect to the base portion.

For example, the base portion 110 may be part of or integrated in the housing of an optical instrument positioned on a stand, such as a tripod, for stable positioning on the ground and the head portion 120 may be a head movable in horizontal and/or vertical directions including optics for indicating a direction or plane or for sighting an object and measuring the position of the object.

As can be seen in FIG. 1, the base angle indicator may be attached to the base portion 110 to indicate a base angle. In other words, the base angle indicator 130 may be attached to the base portion 110 to determine a base angle of the base portion with respect to gravity, such as an angle between the base portion and a reference plane perpendicular to gravity, for example. It is understood that the reference plane is not limited to a plane perpendicular to gravity, i.e. does not have to be truly horizontal, but may be any other plane with a perpendicular or normal not coinciding with the gravity field vector, i.e. a plane inclined to the horizontal. For example, in the case where the device angle range is limited to +10° as an upper limit, and an angle of e.g. 37° is to be indicated by a construction laser, the reference plane may be chosen to be a plane 30° inclined to the horizontal.

In an optimal alignment, it is assumed that the lower surface of the housing including the base portion coincides with the reference plane perpendicular to gravity. However, depending on the conditions in the field, such as uneven and muddy ground, it is easily possible that the lower surface of the housing does not coincide with the plane perpendicular to gravity and thus an angle different from 0° exists.

On the other hand, the head portion 120 of the optical instrument 100 may be rotated or moved in horizontal or vertical direction with respect to the base portion 110. In particular, the head portion is tiltable relative to the base portion within a device angle range having a maximum device angle and a minimum device angle. For example, the head portion 120 may be turned by 10° in vertical direction. Specifically, if the vertical direction is assumed to be the direction of gravity, the head portion 120 may be rotated by 10° above an essentially horizontal plane defined by the base portion or by −10° below this plane. In this example, this corresponds to a maximum device angle of +10° and a minimum device angle of −10°, wherein the range of the device angles α, 10°≧α≧−10°, may be referred to as the device angle range, namely the range of angles that may be assumed by the head portion 120.

As discussed above, the optical instrument 100 also comprises a determination unit 140 connected in signal communication with the base angle indicator 130 for determining an indication angle range of the head portion with respect to gravity based on the base angle and the device angle range.

In the above discussion, it has been noted that the device angle range may be regarded as a range of angles the head portion 120 may scan through, e.g. for indicating or marking a height, wherein angles of the device angle range are determined with respect to the base portion 110, for example the lower surface of the housing of the optical instrument. On the other hand, the indication angle range is a range of angles that may be measured with respect to gravity, and specifically as an angle between the reference plane perpendicular to gravity and the optical axis of an optical arrangement of the head portion 120, which will be described in more detail in FIG. 3.

Therefore, it is clear that the device angle range and the indication angle range only correspond to each other when the plane in which the base portion 110 is positioned corresponds to the reference plane perpendicular to gravity.

In the following, a simple example will be given to explain the relationship between the device angle range and the indication angle range. Here, the determination unit may determine an indication angle range by adding the base angle to the device angle range.

If, for example, the base angle δ is determined to be 2° and the device angle range is 10°≧α≧−10°, which is usually defined by the design and structure of the optical instrument, then the maximum indication angle is 2°+10°=12° and the minimum indication angle is 2°−10°=−8° so that the indication angle range is given by 12°≧β≧−8°, wherein β denotes the indication angle.

This result means that the head portion 120 may rotate in a range from 12° to −8° with respect to the reference plane perpendicular to gravity, namely from 12° above to −8° below the reference plane. In practice, if it is desired to indicate in a direction which is at an indication angle of 5°, the motor drives used for positioning the head portion may rotate the head portion accordingly.

However, if a desired direction or object is at an indication angle of −9°, this angle may not be assumed by the head portion 120 and the motor drive is not able to move the head portion. Therefore, a possible indication angle range may be determined in advance so that a motor drive of the optical instrument may not force a head portion to a position which may not be assumed avoiding possible breakage of parts of the instrument. Accordingly, if the angle cannot be assumed, an alarm, e.g. a Hi-alert as known by construction lasers and described below, may be triggered.

In the above described specific example, the device angle range may also be called a self leveling range, since the indication angle range in this example includes 0° so that the head portion 120 may be leveled even if the base portion 110 is not leveled. Generally, if a device angle range of 10°≧α≧−10° is assumed, self leveling will be possible as long as the base angle δ is smaller than 10° and larger than −10° (10°≧δ≧−10°).

Further, the determination unit 140 may determine whether a desired indication angle, such as an angle of 5°, as discussed above, is within the indication angle range. For example, an indication application, such as a software program, may include angle values of desired indication angles that should be scanned when indicating directions or planes or when measuring objects in the field. Once the inclination of the optical instrument 100 is known, i.e. the angle between the base portion 110 and the reference plane is known, it can be determined in advance whether the head portion 110 of the optical instrument is able to assume the indication angles included in the indication application.

In the above example, it has be assumed that a reference plane is a reference plane perpendicular to gravity, i.e. 0° has been defined as an angle with respect to this reference plane. However, as described above, a reference plane may be chosen to be a plane 30° inclined to the horizontal, for example. In construction, a slope with an inclination of 30° may be chosen as reference plane, in this case the optical instrument may be inclined by 30° using a wedge with 30° inclination underneath the instrument or adjusting the legs of a tripod to adapt to the inclination, for example. Accordingly, using the concept described above, angles of 20° to 40° may be indicated, since the instrument may now be "leveled" at 30°. Therefore, the laser beam of a construction laser may, for example, assume an angle of 37° with respect to the horizontal, i.e. with respect to a reference plane perpendicular to gravity, which could otherwise not be assumed.

It is noted that for practical applications, even if a device angle of 10° is possible, often it is desirable to output an alarm if the base portion inclines by a smaller angle. For example, the instrument may incline by sinking in muddy ground in the field, and thus not only an inclination of the instrument is effected but also the height of the instrument changes so that this may lead to undesired height displacement errors. Therefore, based on the base angle, the determination unit may calculate a displacement in height and an alarm may be triggered if the displacement is larger than a certain amount to avoid height displacement errors.

Therefore, already before starting an indication operation, the determination unit 140 may determine whether a desired indication angle is within the indication angle range that can be assumed by the instrument. If a desired indication angle is not in the range, this may be indicated by the optical instrument, which will be discussed in more detail below.

Further, the determination unit 140 may also determine whether the base angle of 0° is within the indication angle range or in a sub range of the indication angle range so that possible ranges that might be scanned later can be defined in advance.

Figure 2:
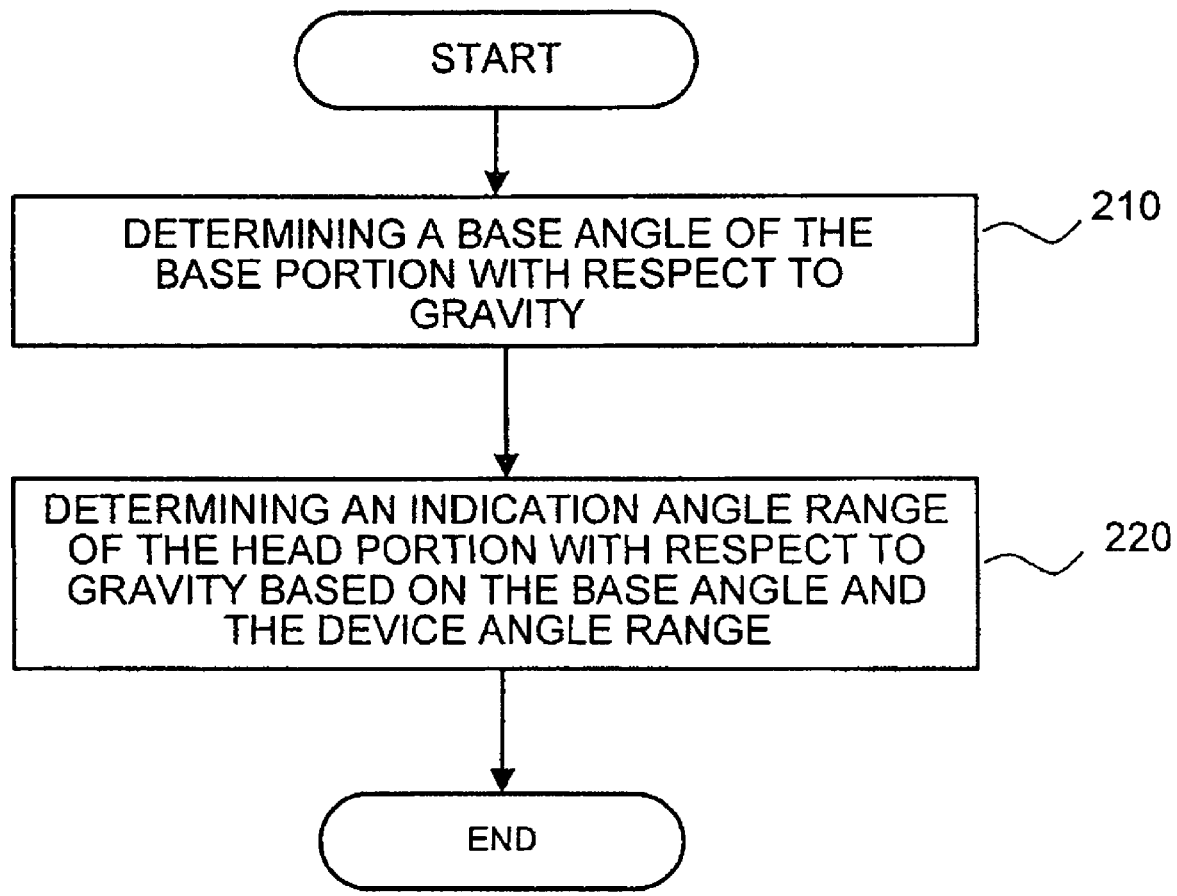
FIG. 2 illustrates operations of a method for operating an optical instrument, such as the optical instrument of FIG. 1, according to another embodiment of the invention.

In the following, operations of an optical instrument will be described with respect to FIG. 2. FIG. 2 illustrates a flow diagram of operations of a method for operating an optical instrument, such as the optical instrument 100 of FIG. 1.

As described above, such an optical instrument comprises a base portion and a head portion tiltable relative to the base portion within a device angle range having a maximum device angle and a minimum device angle.

In a first operation 210, a base angle of the base portion is determined with respect to gravity. As described in detail above, the base angle may be defined as an angle between the base portion or a lower surface of the base portion and a reference plane perpendicular to gravity.

In a subsequent operation 220, an indication angle range of the head portion with respect to gravity based on the base angle and the device angle range is determined. The determination may be performed by a simple calculation, for example, adding the base angle to the device angle range, as describe above.

Therefore, by simply monitoring instrument inclination with a base angle indicator, an indication angle range of angles that may be scanned by the head portion to measure or indicate distances to objects in this angle range may be obtained. Therefore, manually adjusting the leveling of a base portion of an optical instrument so that the base portion corresponds to a reference plane perpendicular to gravity, may be omitted and accurate measurements may be obtained from the instrument even if it is not leveled, since the orientation in space is known and it is possible to adjust for the inclination.

Figure 3:
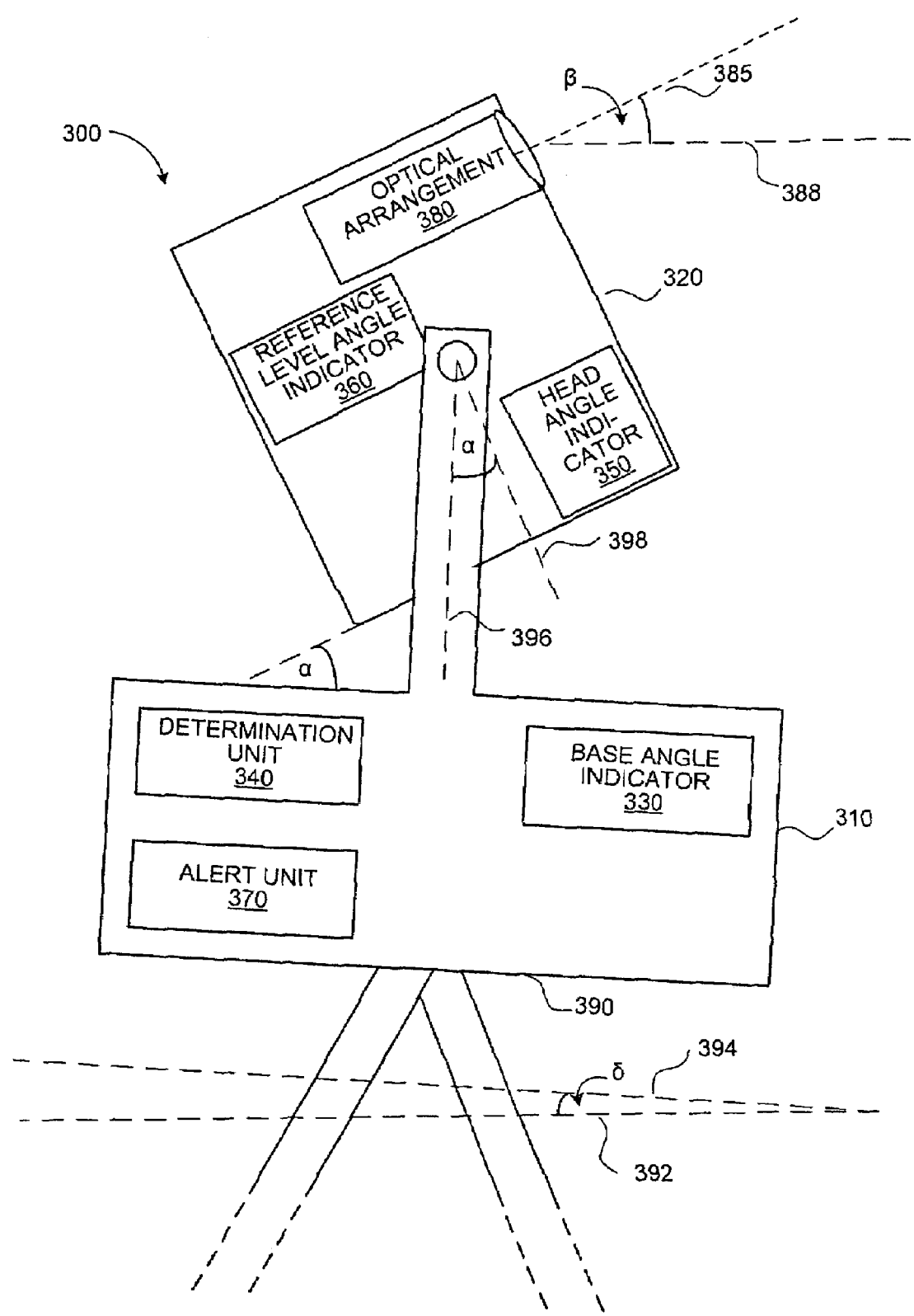
FIG. 3 illustrates elements of a specific optical instrument according to another embodiment of the invention.

In the following, FIG. 3 illustrates elements of an optical instrument according to another more detailed embodiment of the invention.

The optical instrument 300 of FIG. 3 comprises a base portion 310 and a head portion 320, similar to the optical instrument 100 of FIG. 1.

In detail, the base portion 310 comprises a base angle indicator 330, a determination unit 340 and an alert unit 370. The head portion 320 comprises a head angle indicator 350, a reference level angle indicator 360 and an optical arrangement 380. Further, reference sign 390 indicates the lower surface of the base portion.

Similar to the above, the base portion 310 may be part of or integrated in the housing of an optical instrument and be placed on a stand, such as a tripod, which is schematically indicated in FIG. 3.

The base angle indicator 330 and the determination unit 340 may be basically the same as the base angle indicator 130 and determination unit 140, respectively, discussed in FIG. 1, and a detailed description of these elements will be omitted to avoid unnecessary repetition.

Also in the optical instrument 300, the head portion 320 is tiltable relative to the base portion 310 within a device angle range having a maximum device angle and a minimum device angle, as described above. In addition to the base angle indicator 330 attached to the base portion 310 for determining a base angle of the base portion with respect to gravity, a head angle indicator 350 attached to the head portion 320 is provided for determining a head angle of the head portion with respect to base portion, namely the head angle constitutes the above discussed device angle α. The head angle indicator may provide angles of the head portion similar to a grade sensor. Surely, the head angle indicator may also be adapted to determine a head angle with respect to gravity, similar to the base angle, however in this example it is assumed that the head angle indicator is calibrated with respect to the base portion, e.g. by zeroing a head angle in a mechanically defined position in which the head portion and base portion are parallel. Alternatively, calibration is performed with the reference level angle indicator 360, which is described further below.

FIG. 3 illustrates the different angles used. A reference plane 392 which may be perpendicular to gravity and the inclination 394 of the instrument, e.g. defined by the upper or lower surface 390 of base portion of the instrument, define the base angle δ; inclination 390, 394 of the instrument and the lower surface of the head portion define the device angle α (equivalently the normal 396 and the normal 398 define the same angle); and the reference plane 388, which is parallel to plane 392, and the optical axis 385 define indication angle β.

The optical arrangement 380 may include an arrangement of lenses for sighting an object and/or a distance measuring unit including a coherent light source, such as infrared laser or another suitable laser distance measuring device as known in the art, and preferably a fast reflector-less working EDM. Moreover, in an alternative or in addition thereto the optical arrangement may include a laser unit for emitting a laser beam in a reference direction or reference plane to indicate or mark a direction or plane, e.g. as done by a construction laser on a construction site.

According to a specific example, the base angle indicator or the head angle indicator or both may be realized by a micro-electromechanical sensor (MEMS) such as a 3D-MEMS, which are inexpensive and have an accuracy of approximately 0.1°. For example, a MEMS may be defined as a combination of mechanical elements, sensors and actuators interconnected with electronic circuits on a substrate or chip. Therefore, a complex arrangement with light emitting element and a photo sensor may not be needed and electrical signals may be directly received from a small and compact MEMS so as to reduce parts in the instrument. Further, these types of sensors may also be calibrated to enhance their ability for absolute angle determination, which is discussed below with respect to the reference level angle indicator 360. In particular, MEMSs may be useful for larger angle ranges then the bubble level of the prior art.

One or two MEMS may be used for a limit switch calculation, i.e. determine whether a motor drive in the optical instrument should rotate the head portion to an angle position or not, e.g. if it is not in the range, which has been described in the simple example above.

The signals from the MEMSs may be provided to the determination unit 340, as desired, to determine the indication angle range and/or whether a desired indication angle is within the indication angle range, as discussed above.

Conventionally, mechanically restrictions, such as stoppers, may be provided to limit the rotation of drives. On the other hand, in the above example, it has been described that it can be determined that the head portion should better not be rotated to a specific angle, since the specific angle is out of the range, i.e. out of the indication angle range, and thus damage of the head portion, drive motors or drives is possible, since mechanical contact may be avoided.

Further, the alert unit 370 may be provided in the optical instrument for outputting an alert signal on the basis of the determination result, namely the determination result whether a desired indication angle is within the indication angle range or sub range or whether the base angle of 0° is within the indication angle range to allow self leveling, i.e. whether an indication angle of 0° can be assumed by the head portion.

During operation, it may be feasible that the determination unit repeatedly determines the indication angle range since, for example, the base angle of the base portion of the optical instrument 100, 300 may change with time, e.g. the optical instrument may change its position and may incline by sinking in muddy ground in the field. Therefore, by repeatedly determining the indication angle range, the range may be compared to desired indication angles of an indication application, for example, and by outputting an alert signal, such as a blinking light or a sound, the user may be warned.

In the self leveling example, i.e. when the head portion is able to be leveled so that the optical axis 385 of the optical arrangement 380 is in the reference plane perpendicular to gravity, the base angle may be different from 0°. If the device angle range is $+10° \geq \alpha \geq -10°$, for example, the base angle may be up to 10° above and below the reference plane and the head portion 320 will still be able to level. Therefore, by simply obtaining the base angle from the base angle indicator 330 at the determination unit 340, the determination unit 340 may determine whether the optical instrument is able to level.

For example, if the optical instrument 300 slowly sinks in soft ground in the field, the inclination of the instrument, i.e. the base angle, may be up to 10° and the head portion 120 will still be able to level. However, if the instrument further sinks in, this movement may also be detected by the determination unit repeatedly, obtaining the base angle and determining the indication angle range at different or predetermined time intervals so that the alert unit 370 may output an alert signal, if angle becomes too large to level the head portion.

In a simple case, the base angle indicator 330 may constantly supply the determination unit 340 with updated output signals, i.e. base angles, which may be stored and compared to a predefined threshold, wherein an alert signal is triggered when the value of the base angle is above a certain threshold. In practice, the threshold may be much lower than 10°, such as 2°, due to height displacement errors, which have been described above.

Similarly, the determination unit may also obtain both the base angle and the head angle and determine the difference between the base angle and the head angle and output an enable signal if the absolute value of the difference is smaller than a self leveling threshold or a disable signal if the absolute value of the difference is larger than the self leveling threshold. For example, a tilt of more than 10° is not allowed, wherein the tilt of the head portion is measured relative to the base portion.

In the optical instruments 100 and 300 of FIGS. 1 and 3, respectively, the determination unit 140 and 340 may act as a controller and processor and may be realized by hardware arrangement, such as by hardwired circuits, or ASICs (application specific integrated circuits) or software or any suitable combination of the above.

The determination unit may receive the base angle from the base angle indicator 130, 330 by wire as electric signal, for example, or wirelessly via an I/O interface of the determination unit. Similarly, the head angle from the head angle indicator 350 may also be received via wire or wirelessly at the determination unit. Further, the determination unit 340 is connected in signal communication to the alert unit 370 to trigger the output of the alert signal.

Further, the determination unit 340 and/or the head angle indicator 350 may also be connected to a reference level angle indicator 360, as shown in FIG. 3, providing a reference angle, such as a reference level angle. The reference level angle indicator 360 may in particular be advantageous for calibrating the base angle indicator, the head angle indicator or both. In FIG. 3, reference level angle indicator is placed in the head portion so that the head angle indicator may be calibrated and transmission errors between the head portion and base portion can be minimized.

For example, when micro-electromechanical sensors are used for the base angle indicator and the head angle indicator, these sensors are often more suitable to determine relative angles rather than absolute angles, such as a level. Therefore, reference level angle indicator 360, which is able to measure absolute angles, may be used for calibration so that also absolute positions of the optical instrument and the head and base portion in horizontal and vertical mode can be easily obtained.

In a further embodiment the determination unit and other units of the optical instrument are realized by hardware components or by software executed on a processing unit or may be realized by combinations thereof. In an example, a central processing unit and a memory are provided, the memory storing coded instruction for execution on the processing unit. The processing unit is connected to sensors such as a MEMS sensor to determine a base angle. Here, the coded instructions include instructions to determine a base angle of the base portion with respect to gravity and instructions to determine an indication angle range of the head portion with respect to gravity based on the base angle and the device angle range. In this respect in an embodiment a program includes the coded instructions. Moreover, a computer readable medium may be provided in which the program is embodied. Still further, a computer program product may comprise the computer readable medium.

In the following, specific embodiments of operations of an optical instrument, such as optical instrument 300 of FIG. 3 are described with to FIGS. 4 and 5.

Figure 4:
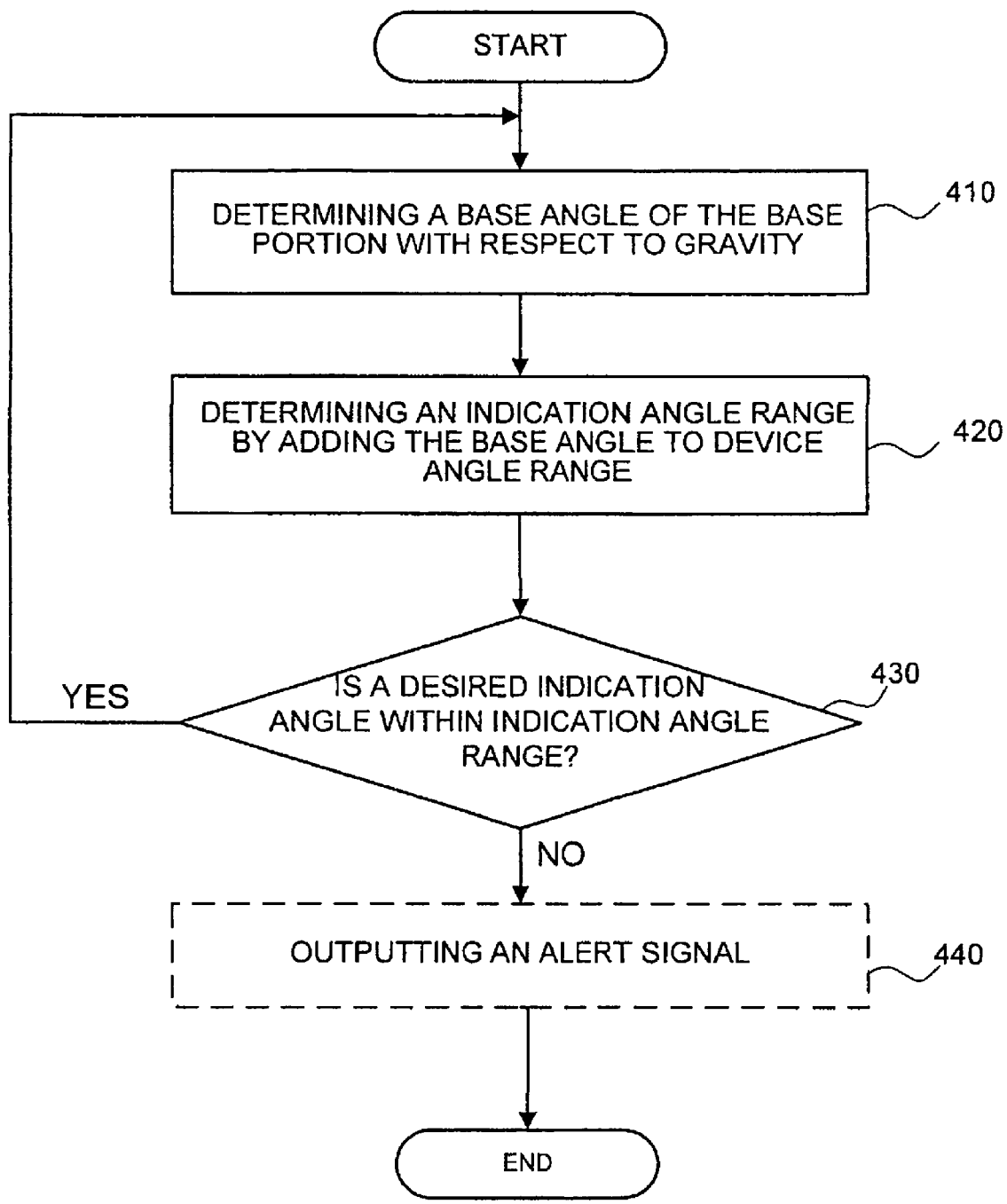
FIG. 4 illustrates operations of another method for operating an optical instrument, particularly determining the operability repeatedly, according to another specific embodiment of the invention.

In operation 410 of FIG. 4, the base angle of the base portion with respect to gravity, e.g. the angle between the lower surface 390 of the housing of the base portion 310 and the reference plane perpendicular to gravity, is determined.

In a subsequent operation 420, the indication angle range is determined by adding the base angle obtained from the base angle indicator 330 in the determination unit 340 to the device angle range. In detail, the device angle range may be known in advance since it is largely dependent on the design of the instrument and the components used, and the device angle range may thus be stored in a storage unit or register of the determination unit 340 and added to the base angle in the determination unit 340.

In operation 430, it is checked whether a desired indication angle is within the indication angle range. For example, as described above, a desired indication angle may be an indication angle of an indication application or an indication angle of a user operating the instrument.

If in an operation 430 it is determined that a desired indication angle is within the indication angle range "YES", the flow proceeds to the start and operation 410 is again executed. Thereby, during operation, it may be repeatedly checked whether the optical instrument is still operable, i.e. even if the optical instrument sinks slowly in mud or otherwise changes its inclination, operation of the instrument may still be performed as long as an indication angle to be assumed by the instrument is within the indication angle range.

If it is determined in operation 430 that the desired indication angle is not within the indication angle range, "NO", optionally an alert signal may be output in operation 440 so that the user may reposition the optical instrument.

Figure 5:
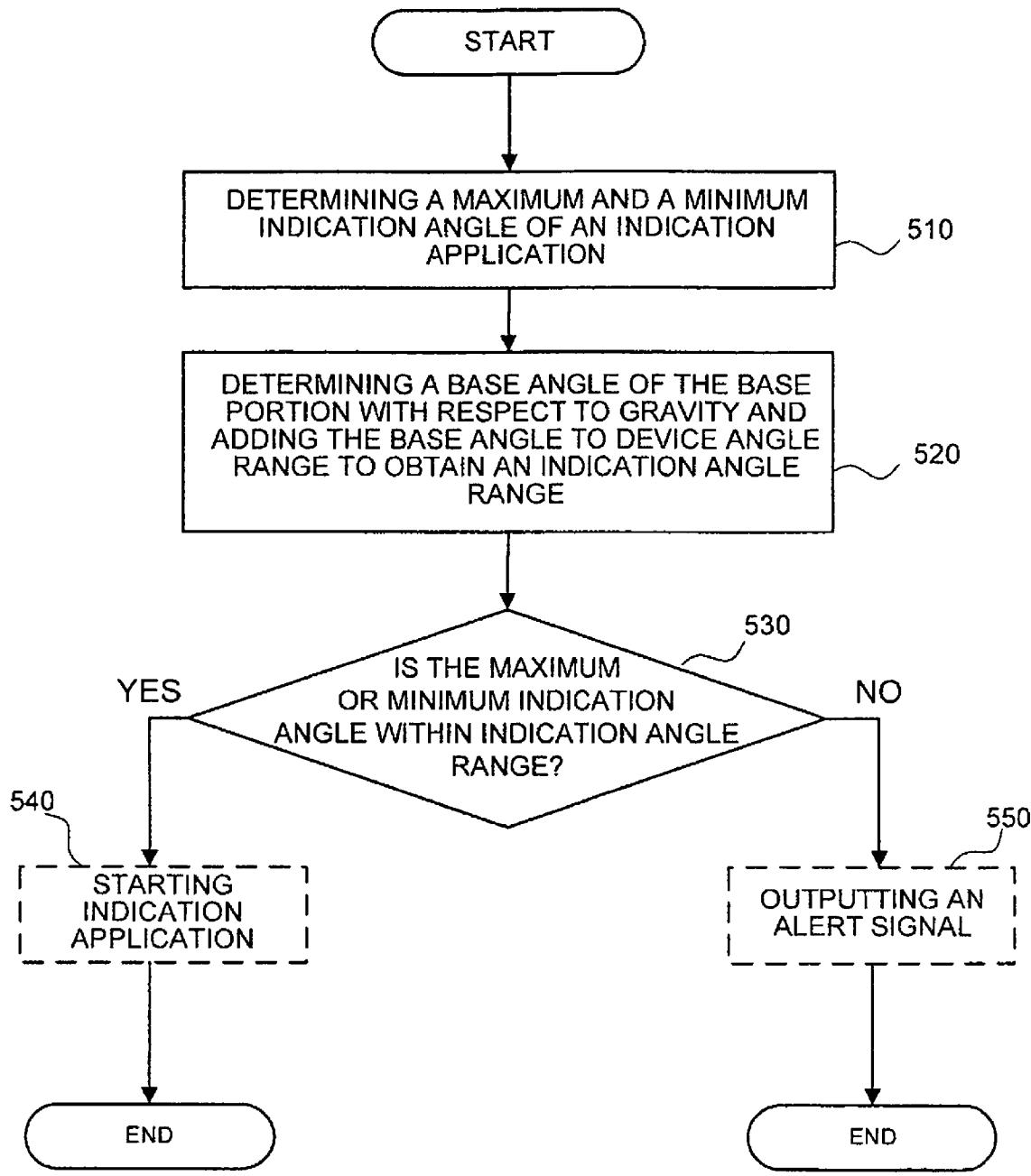
FIG. 5 illustrates operations of another method for operating an optical instrument according to another specific embodiment of the invention.

In FIG. 5, it is assumed that the optical instrument is controlled by an indication application, such as a software program, predefining scanning patterns of the instrument. To be more specific, the optical instrument may be provided with an indication application running on a processor of the optical instrument, wherein the indication application may be analyzed in advance to determine predefined scanning patterns, e.g. a basic pattern of a building under construction.

Therefore, it may be already defined in the indication application which angles are to be scanned or indicated and it may be checked whether these angles are in the indication angle range so that they can be actually indicated by the instrument. Consequently, in operation 510 the indication application may be analyzed, and a maximum and a minimum indication angle are determined. The maximum and minimum indication angles may be the most extreme angles in the vertical direction or in the horizontal direction in the indication application.

Subsequently, in operation 520 the base angle may be determined, as described above, and added to the device angle range to obtain an indication angle range.

Then, in operation 530 it may be determined whether the maximum and/or minimum indication angle is within the indication angle range. The two options in the further process, operations 540 and 550, are indicated by dashed boxes in FIG. 5. If affirmative, the flow may proceed to operation 540 and the indication application may be started so that the head portion of the optical instrument 300 changes its angle to scan the predetermined pattern of the indication application.

However, if the maximum and/or minimum indication angle is not within the indication angle range, an alert signal may be output in operation 550 so that the user repositions the instrument.

As described above, the determination unit of the optical instrument may be largely realized by a controller including a processor or integrated circuit or similar, and is not limited to the above.

For example, the determination unit may comprise a storage unit and some kind of controller. Note that the term "unit" in the above described embodiments should not be construed as limiting the individual elements to a separate tangible part but should be understood as a kind of functional entity, wherein also the functions of the alert unit may be integrated in the determination unit.

The functions of the determination unit may be embodied as software program of the determination unit and may be realized by the controller comprising or being connected to a memory, such as a RAM, ROM, hard disk, EEPROM, a disk, a flash memory etc. A program code stored in the memory may be a program including instructions adapted to cause a processor in the controller to carry out the operations of the determination unit described above.

A program code stored in the memory may be a program including instructions adapted to cause a processor in the controller to carry out the operations of the optical instrument described above.

In other words, a program may be provided including instructions adapted to cause a processor, such as a processor of the controller, to carry out combinations of the above described operations.

Moreover, a computer readable medium may be provided in which the program is embodied. The computer readable medium may be tangible, such as a disk or other data carrier, or may be intangible, constituted by signals suitable for electronic, optic or any other type of transmission. A computer program product may comprise the computer readable medium and when loaded into a program memory of a computer, processor or microcontroller causes the processor or microcontroller to carry out the above described operations.

As described above, embodiments and examples of the invention allow for determining angle ranges, in which an optical instrument may be operated. Therefore, the invention may provide a simple solution to monitoring instrument inclination and allowing operation in a large angle range.

It will be appreciated that various modifications and variations can be made in the described optical instruments and methods as well as in the construction of this invention without departing from the scope or spirit of the invention.

The invention has been described in relation to particular embodiments and examples which are intended in all aspects to be illustrative rather than restrictive. Those skilled in the art will appreciate that many different combinations of hardware, software and firmware will be suitable for practicing the invention.

Moreover, other implementations of the invention will be apparent to the skilled person from consideration of the specification and practice of the invention disclosed herein. It is intended that the specification and the examples be considered as exemplary only. To this end, it is to be understood that inventive aspects lie in less than all features of the foregoing disclosed implementation or configuration. Thus, the true scope and spirit of the invention is indicated by the following claims.

The invention claimed is:

1. Optical instrument, comprising
   a base portion;
   a head portion tiltable relative to the base portion within a device angle range having a maximum device angle and a minimum device angle;
   a base angle indicator attached to the base portion for determining a base angle of the base portion; and
   a determination unit for determining an indication angle range of the head portion based on the base angle and the device angle range.

2. Optical instrument of claim 1, wherein the determination unit is adapted to determine the indication angle range by adding the base angle to the device angle range.

3. Optical instrument of claim 1, wherein the determination unit is adapted to determine whether a desired indication angle is within the indication angle range.

4. Optical instrument of claim 1, wherein the determination unit is adapted to determine whether the base angle of zero is within one of the indication angle range and a sub range of the indication angle range.

5. Optical instrument of claim 3, further comprising an alert unit for outputting an alert signal on the basis of the determination result.

6. Optical instrument of claim 1, wherein the determination unit is adapted to repeatedly determine the indication angle range during operation.

7. Optical instrument of claim 1, further comprising a head angle indicator attached to the head portion for determining a head angle of the head portion.

8. Optical instrument of claim 7, wherein the determination unit is adapted to obtain the difference between the base angle and the head angle and to output an enable signal if the absolute value of the difference is smaller than a self leveling threshold.

9. Optical instrument of claim 1, wherein at least one of the base angle indicator and the head angle indicator is a microelectromechanical sensor, MEMS.

10. Optical instrument of claim 1, further comprising a reference level angle indicator for calibrating at least one of the base angle indicator and the head angle indicator.

11. Method for operating an optical instrument, the optical instrument comprising a base portion and a head portion tiltable relative to the base portion within a device angle range having a maximum device angle and a minimum device angle, wherein the method comprises
   determining a base angle of the base portion; and
   determining an indication angle range of the head portion based on the base angle and the device angle range.

12. A program including instructions adapted to cause data processing means to carry out the method of claim 11.

13. A computer readable medium, in which a program is embodied, where the program is to make a computer execute the method of claim 11.

14. A computer program product comprising the computer readable medium according to claim 13.

* * * * *

UNITED STATES PATENT AND TRADEMARK OFFICE
CERTIFICATE OF CORRECTION

| | | |
|---|---|---|
| PATENT NO. | : 7,841,094 B2 | Page 1 of 1 |
| APPLICATION NO. | : 12/360314 | |
| DATED | : November 30, 2010 | |
| INVENTOR(S) | : Lars Schumacher | |

It is certified that error appears in the above-identified patent and that said Letters Patent is hereby corrected as shown below:

Col. 4, Line 43, "indicator may be" should read --indicator 130 may be--.

Signed and Sealed this
Tenth Day of May, 2011

David J. Kappos
*Director of the United States Patent and Trademark Office*